March 10, 1959     D. G. SCORGIE     2,876,642
HIGH ACCURACY VOLTAGE REFERENCE
Filed Nov. 28, 1956
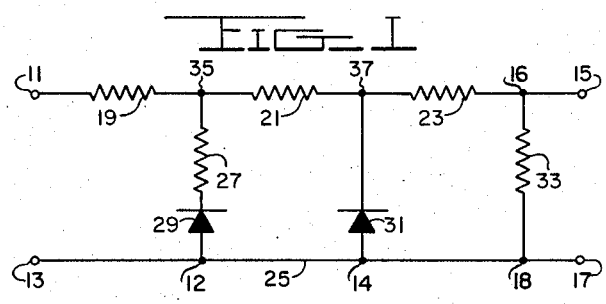
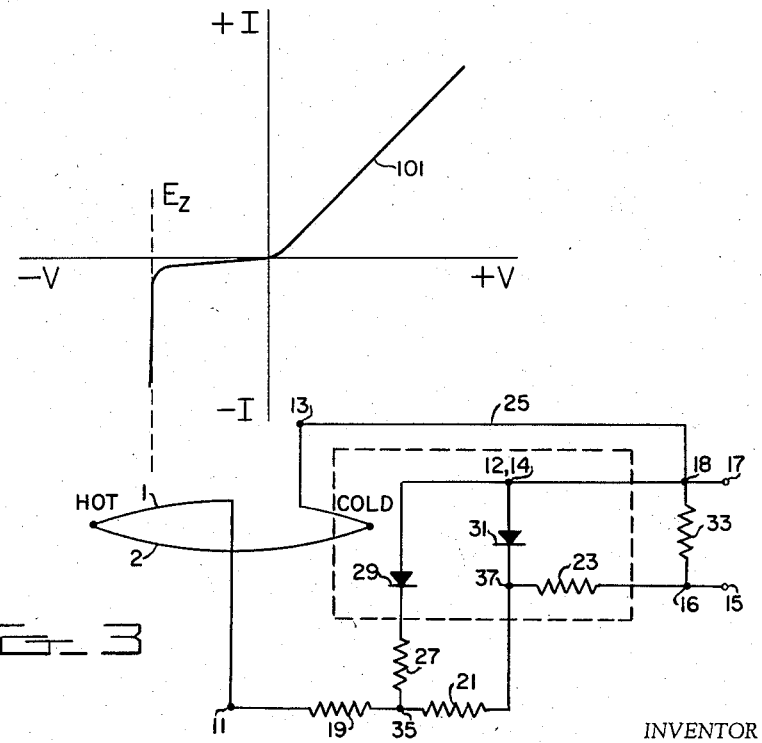
INVENTOR
DONALD G. SCORGIE
BY *W. R. Maltby*
*Richard C. Reed*
ATTORNEYS

United States Patent Office 2,876,642
Patented Mar. 10, 1959

2,876,642

HIGH ACCURACY VOLTAGE REFERENCE

Donald G. Scorgie, Pittsburgh, Pa.

Application November 28, 1956, Serial No. 624,954

2 Claims. (Cl. 73—361)

(Granted under Title 35, U. S. Code (1952), sec. 266)

The invention described herein may be manufactured and used by or for the Government of the United States of America for governmental puposes without the payment of any royalties thereon or therefor.

This invention relates to a circuit for producing an accurate voltage reference and more particularly to a circuit for producing an accurate reference utilizing the Zener breakdown characteristic of a semi-conductor rectifier.

An object of this invention is to provide a reference voltage circuit suitable for temperature control system.

Another object of this invention is to provide an accurate voltage reference.

A further object of this invention is to provide a voltage reference with accuracies in the order of 0.1%.

A still further object of this invention is to provide a voltage reference utilizing the Zener breakdown characteristic of a semi-conductor.

Another object of this invention is to provide a reference voltage circuit employing a silicon-junction diode.

Another object of this invention is to provide a voltage reference circuit utilizing the Zener breakdown characteristic of a silicon-junction diode.

Another object of this invention is to provide a thermocouple measuring system in which the temperature may be measured irrespective of cold junction temperature variations.

Another object of this invention is to provide a voltage proportional to the temperature of the hot junction of a thermocouple.

Another object of this invention is to provide apparatus to compensate for temperature variations in the cold junction of a thermocouple.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 illustrates schematically an embodiment of a voltage reference circuit.

Fig. 2 illustrates graphically the approximate Zener breakdown characteristics of a semi-conductor such as a silicon-junction diode.

Fig. 3 illustrates schematically a preferred embodiment of the invention.

Referring now to Fig. 1 of the drawings in which an embodiment of the voltage reference circuit is illustrated, a voltage input $E_i$ feeds into terminals 11 and 13. The output $E_o$ is taken at terminals 15 and 17. Resistors 19, 21 and 23 serially connect between terminals 11 and 15 respectively. Solid conductor 25 connects between input terminal 13 and output terminal 17. Serially connected resistor 27 and silicon-junction diode 29 connect between the juncture 35 of resistors 19 and 21 at one end and to solid conductor 25 at the other end at juncture 12. Silicon-junction diode 31 connects to the juncture between resistors 21 and 23 at one terminal 37 and to conductor 25 at the other terminal 14. Resistor 33 connects between output terminals 15 and 17 at junctions 16 and 18, respectively.

The circuit thus described forms a two stage voltage reference circuit. In practice, the number of stages may be cascaded until the desired accuracy is attained. In Fig. 1, diode 29 may have a greater or lesser Zener breakdown voltage than diode 31.

In Fig. 2 of the drawings, in which an approximate current voltage relationship is shown, the dotted line at $E_z$ indicates the Zener breakdown voltage. The curve 101 shows the relationship of current flow to the applied voltage across the terminal of a semi-conductor such as a silicon-junction diode. In the $+V$ region, the voltage is at a polarity across the terminals that results in the greatest current flow, that is, the "forward direction" of current flow for the semi-conductor. In this region, the current flow is substantial and proportional to the magnitude of the potential V across the terminal of the semi-conductor. In the region of $-V$ on the graph or in other words the region in which the polarity of the voltage applied to the terminals of a diode causes current flow in the "reverse" direction, the current flow will remain very small until the voltage $E_z$ is reached. At potential $E_z$, known as the Zener breakdown voltage, current flow will rise rapidly. The voltage drop will remain approximately at $E_z$ for large amounts of current flow. Voltage regulation is thus achieved by applying a voltage across the terminals of a semi-conductor in the "reverse" polarity, that is, the polarity reverse to the normal current flow polarity for a semi-conductor.

Fig. 3 shows the manner in which the thermocouple 1, 2 is associated with the circuit. The dotted rectangle shows that the reference, or cold junction of the thermocouple 1, 2, along with the unidirectional devices 29 and 31 and resistor 23, are thermally isolated from the hot junction of thermocouple 1, 2. Otherwise, the circuit shown in Fig. 3 is identical with the circuit of Fig. 1.

Referring again to Fig. 1 of the drawings, a D. C. voltage source is applied to terminals 11 and 13 with terminal 11 having a positive potential and terminal 13 having a negative potential. The voltage applied between juncture 35 and common conductor 25 will at first appear across diode 29 and then, as soon as the Zener breakdown voltage is reached across diode 29, the diode will break down and the voltage applied will now be divided between resistor 27 and diode 29. The voltage across diode 29 will be the Zener breakdown voltage. The voltage between juncture 35 and common conductor 25 will be reduced upon the breakdown of diode 29 by virtue of current flow through resistor 19. The potential across juncture 37 and common conductor 25 will be the same as that at terminal 35 before diode 31 breaks down. The potential at 37 will appear across the terminals of the diode 31. As soon as the diode breaks down, the Zener breakdown voltage of diode 31 will appear across diode 31 and also at junction 37. Upon breakdown of diode 31. the voltage at juncture 37 may be less than at juncture 35 and this difference voltage will appear across resistor 21. The final regulated voltage will appear across juncture 37 and conductor 25 when both diodes have broken down and there is current flow through them. The regulated voltage is divided between resistors 23 and 33, the output voltage appearing across resistor 33, or at the output terminals 15 and 17.

Diodes 29 and 31 should have a Zener breakdown voltage in the same order of magnitude. It would be preferable that the Zener breakdown voltage of diode 27 be greater than that of diode 31. If the crystal diodes 29 and 31 have nearly the same breakdown voltages or if the Zener breakdown voltage of crystal diode 29 is larger or even slightly smaller than that of crystal diode 31, then resistor 27 may be eliminated. Should the Zener breakdown voltage of diode 29 be slightly smaller than that of diode 31 and resistor 27 is eliminated, the current flow through diode 29 will then be an order of magnitude or so larger than the current flow through diode 31.

The voltage reference circuit as illustrated in Fig. 1 is a two-stage circuit with crystal diode 29 as the first stage voltage reference and diode 31 as the second stage voltage reference. This voltage reference circuit may comprise a single stage employing just one crystal diode or it may comprise more than two stages in which case more than two crystal diodes will be employed, one for each stage. The accuracy of the voltage regulation is increased with each additional stage. For the two stage circuit as described, regulation is attained in which output voltage variation is about 0.1 percent.

The voltage reference circuit may also be used in conjunction with thermocouple devices as shown in Fig. 3. In such a system the diodes 29 and 31 are in thermal contact with resistor 23 and the cold junction of the thermocouple. The output voltage $E_o$ will vary only with the temperature of the hot junction and hence will give a voltage reading proportional to the temperature of the hot junction. This compensation is implemented by the resistors and diodes having certain temperature characteristics. The combined temperature characteristics of these elements will compensate for a drift or change in temperature that may occur at the cold junction of the thermocouple. Take for example the instance where the diodes and resistors have a positive temperature coefficient, particularly resistor 23 and diodes 29 and 31. If the circuit so constructed is connected with input terminals 11 and 13 receiving the output from a thermocouple, compensation for a change in the cold junction of the thermocouple will be effected. The resistor 23 and diodes 29 and 31 are in thermal contact with the cold junction of the thermocouple. In other words, these elements are kept at the same temperature. When the cold junction is at the standard or reference temperature, then the input voltage will be indicative of the temperature at the hot junction. The voltage output will be determined by the Zener breakdown voltage of the diodes. With the voltage output thus established, the output will be kept at this potential range of the input voltage. The potential drop across the diodes will be constant for a particular temperature. When the temperature of the cold junction increases, the temperature of the resistor 23 and diodes 29 and 31 also increases. Since the resistor 23 and diodes 29 and 31 have a positive temperature characteristic the voltage drop across the diodes will increase. An increase in the cold junction temperature will cause a lower potential difference to be applied to the voltage reference circuit and consequently a lower output voltage $E_o$ may be expected since the voltage $E_i$ has been reduced. A compensation however results from the positive temperature characteristics of the diodes and the resistor 23. The reduction in voltage appearing across diode 29 will be compensated for partly by the increase in Zener breakdown for this diode which will now supply a larger voltage to diode 31. Diode 31 will also have a larger Zener breakdown and the voltage supplied to the resistor 23 will be somewhat larger than normal. The remaining compensation will occur in the resistor 23 which will give an increased potential drop because of the positive temperature characteristic of this resistor. The resulting output voltage will be the same with the elevated cold junction temperature as with the cold junction temperature at the reference level.

The output voltage $E_o$ may be made any function of temperature desired by the proper selection of resistor 23.

Obviously many modifications and variations of the present invention are possible in the light of the above teachings. It is therefore to be understood that within the scope of the appended claims the invention may be practiced otherwise than as specifically described.

What is claimed is:

1. In combination, a thermocouple with a reference junction and a measuring junction, first and second output terminals, means connecting one of said junctions to said first output terminal, first and second resistors serially connected with a tie point therebetween, said first resistor connected to the other of said junctions, said second resistor connected to the second output terminal, a silicon junction diode connected between said tie point and said first output means, said silicon junction diode poled for conduction therethrough in the low conductivity direction, said diode having a Zener breakdown voltage varying positively with the temperature of said one of said junctions, said second resistor having positive resistance characteristics, said diode and said second resistor in thermal contact with said one of said junctions.

2. In combination, a thermocouple with a reference junction and a measuring junction, first and second output terminals, means connecting one of said junctions to said first output terminal, impedance means including resistors serially connected with tie points therebetween, said impedance means connected between the other of said junctions and said second output terminal, silicon junction diodes connected between each tie point and said first output terminal, said diodes poled for conduction therethrough in the low conductivity direction, said diodes having a Zener breakdown voltage varying positively with the temperature of said one of said junctions, one of said resistors having positive resistance characteristics, said diodes and said one resistor in thermal contact with said one of said junctions.

References Cited in the file of this patent

UNITED STATES PATENTS 2,714,702    Shockley    Aug. 2, 1955